Jan. 9, 1968

H. M. MORROW 3,362,754

CUTTING BIT AND HOLDER

Filed Oct. 13, 1965

INVENTOR.
HARRY M. MORROW
BY
Woodling Krost Granger+Krost
Attys.

INVENTOR.
HARRY M. MORROW

United States Patent Office 3,362,754
Patented Jan. 9, 1968

3,362,754
CUTTING BIT AND HOLDER
Harry M. Morrow, Navarre, Ohio, assignor to The Bowdil
Company, Canton, Ohio
Filed Oct. 13, 1965, Ser. No. 495,637
6 Claims. (Cl. 299—82)

ABSTRACT OF THE DISCLOSURE

A cutting bit and holder particularly adapted for the coal mining industry with the holder having sidewalls which define a slot with portions of the surface of a cone formed in the sidewalls. Tapered pins are positioned in these surfaces and also extend into complementary surfaces formed on opposite sides of the cutting bit to secure the bit in the slot. A variation of this concept provides tapered members held on opposite sides of the slot which tapered members interfit with tapered surfaces on the bit to hold the bit in the slot.

---

The present invention relates in general to cutting apparatus and more particularly to a cutter bit and holder which is particularly adapted for use in the coal mining industry.

An object of the present invention is to provide a holder and cutter bit combination which utilizes an open sided slot in the holder disposed generally in the direction of travel of the combination when located in its position of use.

Another object of the present invention is to provide a holder and cutter bit combination which utilizes an open sided slot in the holder with tapered wall means therein which cooperate with similar wall means on the cutter bit for holding the two together.

Another object of the present invention is to provide a holder and cutter bit combination which utilizes two separate parts for the holder which includes a holder body and inserts for engagement with the cutter bit.

Another object of the present invention is to provide a holder and cutter bit combination which utilizes a holder having a body which may be heat treated for maximum strength and inserts which may be of a material of maximum wear resistance.

Another object of the present invention is to provide a holder for a coal cutting bit which includes a body and a replaceable part thereon for engagement with the bit.

Another object of the present invention is to provide a holder and cutter combination which permits the bit to be located at the back end of the holder which in turn permits a construction which does away with grabbing and gouging of the bit into the material being cut.

Another object of the present invention is to provide a holder and cutter bit combination which perimts easy insertion and withdrawal of the cutter bit and which also prevents pushing of the bit further into the holder during the cutting process.

Other objects and a fuller understanding of this invention may be had by referring to the following description and claims, taken in conjunction with the accompanying drawings, in which:

Figure 1:
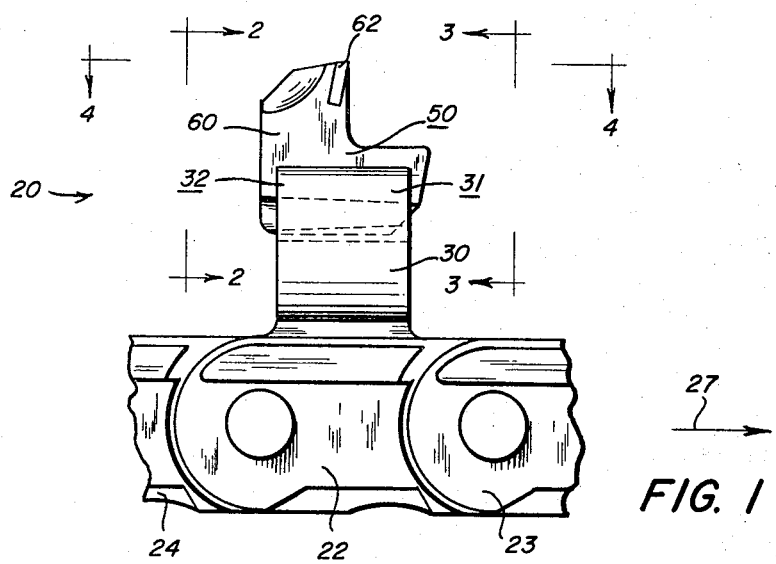
FIGURE 1 is a side elevational view of the cutting apparatus of the present invention.

The cutting apparatus of the present invention is illustrated in a preferred embodiment which is shown in FIGURES 1 through 4 of the drawings and the cutting apparatus in general has been indicated by the reference numeral 20. This cutting apparatus which has been illustrated is peculiarly adapted for use in the mining of coal and in the embodiment illustrated, the cutting apparatus includes a plurality of chain links indicated by the numerals 22, 23, and 24 which form a part of a continuous run of a conveyor which is adapted to travel in the general direction of the arrow 27 which may be described as a cutting path, in a manner which is generally known by those skilled in the art. These links are pivotally connected together by pivot pins not numbered in the drawings, and the chain is generally carried on sprocket wheels which are of a conventional construction. The present invention relates primarily to the combination of the cutter bit and the holder therefor, and it will be seen in FIGURE 1 that the link 22 comprises an integral holder body 30 which has front and rear portions designated by the reference numerals 31 and 32 respectively. It will be appreciated by those skilled in the art that the links 23 and 24 may also carry a holder body and cutter bit which would be angularly out of line with the holder body and cutter bit immediately next to it, to facilitate easy removal of the bit, or the links 23 and 24 may merely serve to provide an interconnecting means to a next link which includes as a part thereof a holder body and a cutter bit.

Figure 2:
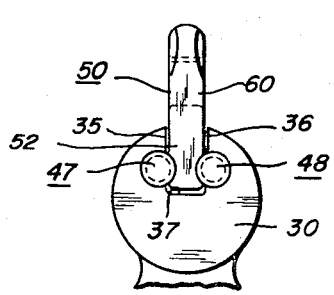
FIGURE 2 is a view taken generally along the line 2—2 of FIGURE 1.
Figure 3:
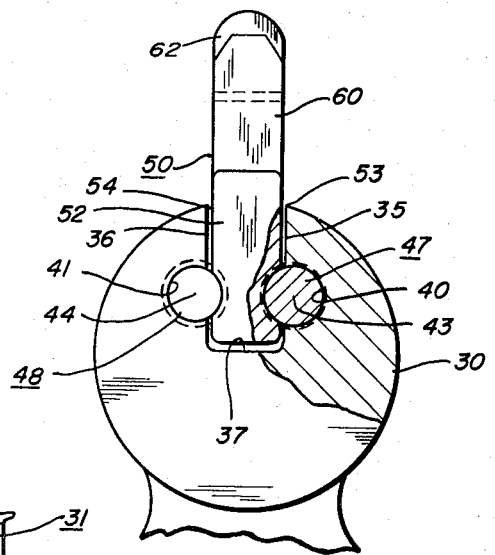
FIGURE 3 is an enlarged view taken generally along the line 3—3 of FIGURE 1.
Figure 4:
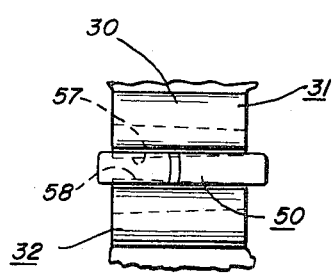
FIGURE 4 is a view taken generally along the line 4—4 of FIGURE 1.

The holder body as best seen in FIGURES 2 and 3 is comprised of wall means which defines a generally U-shaped slot which extends the entire length of the holder body from the front to the rear portion thereof. This slot is provided with first and second side walls 35 and 36, a bottom wall 37, an an upper open end not identified. In other wards, the slot just previously described extends completely through the upper surface of the holder body.

The first and second side walls 35 and 36 are respectively provided with wall means 40 and 41, each of which define the surface of at least a portion of a core and as will specifically be seen in viewing FIGURES 2 and 3, each of the conical surfaces intersects the side walls and if continued, would extend into the slot proper. The conical surfaces 40 and 41 have axes identified by the reference numerals 43 and 44 which are generally parallel to each other and are also parallel to the direction of the cutting path 27. The smaller diameter portion of each of the conical surfaces is located in the front portion of the holder body and the larger diameter portions are located at the rear portion of the holder body. In other words, the conical surfaces taper from a smaller size in the front to a larger size at the rear.

First and second hardened conically shaped pins 47 and 48 are located respectively in the first and second wall means 40 and 41 and since each of the pins forms a continuous annular surface, a portion of each pin extends into the slot proper as shown particularly in FIGURES 2 and 3. As in the case of the surfaces within which they reside, the smaller diameter portion of the pin is located at the front of the slot and the larger diameter of the pin is located at the rear of the slot. These pins are preferably made of a hard, maximum wear-resistant material, for example chrome plate or tungsten carbide. The pins 47 and 48 are held in the position shown in FIGURES 1 through 4 by any suitable means, not specifically indicated in the drawings, but which may include peaning over the pins so they will not be removed from the conical surfaces within which they reside. Because of this particular construction, the portion of the pins which reside within the slot formed in the holder body, forms a tapered construction which has a smaller opening in the back of the slot than in the front of the slot.

A cutter bit 50 is provided which performs the function of cutting coal or other material with which the device is used, and is suitably held by the holder body. The cutter bit 50 includes a body portion 52 which has first and second generally parallel walls 53 and 54 respectively. The first and second walls 53 and 54 are provided with wall means 57 and 58 (FIGURE 4) respectively which conform to that portion of the surface of the pins 47 and 48 which reside in the slot. In other words, the cutter bit when occupying the position shown in FIGURES 1 through 4, is precisely held in position by surfaces thereon which matingly engage the surfaces of the pins. The cutter bit is also provided with a bit point carrying member 60 which in this particular instance forms an integral part thereof and which extends upwardly generally at right angles to the body portion. A bit point 62 is secured to the bit point carrying member and is the primary part of the cutter bit which engages the material to be cut.

Figure 5:
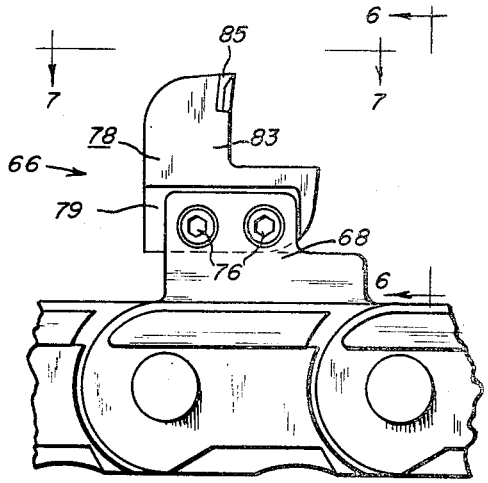
FIGURE 5 is a side elevational view of a modified form of the cutting apparatus of the present invention.
Figure 6:
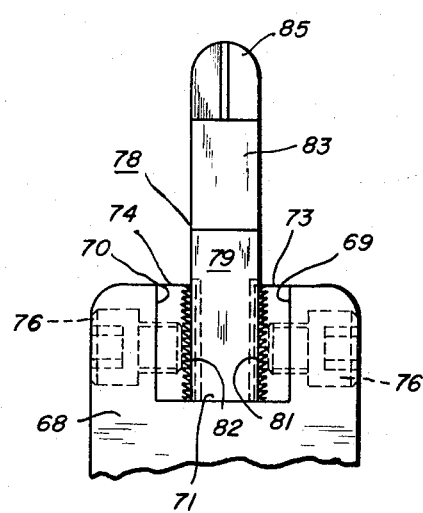
FIGURE 6 is an enlarged view taken generally along the line 6—6 of FIGURE 5.
Figure 7:
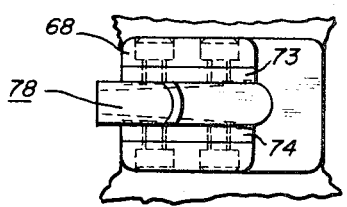
FIGURE 7 is a view taken generally along the line 7—7 of FIGURE 5.

A modified form of the cutting apparatus is illustrated in FIGURES 5, 6 and 7 and in this embodiment the cutting apparatus has been indicated generally by the reference numeral 66. This embodiment includes a holder body 68 which also has front and rear portions and wall means in the holder body defines a generally U-shaped slot which extends the entire length of the upper portion of the holder body. The slot has first and second sidewalls 69 and 70 and a bottom wall 71 as well as an unidentified open upper side or end. Positioned in each of the U-shaped slot are first and second hardened insert members 73 and 74 which are provided with tapered knurled surfaces. These insert members are suitably secured to each of the sidewalls 69 and 70 by means of screws 76. As will be noted, particularly in FIGURE 7, the knurled surfaces taper toward each other as they extend from the front to the rear portion of the holder body. As in the embodiment of FIGURES 1 through 4, there is provided a cutter bit 78 which has a body portion 79 which in turn has first and second tapered side walls 81 and 82 respectively, which are tapered in a manner corresponding to the knurled surfaces of the hardened insert members and with the cutter bit positioned in the holder are located in engagement therewith. A bit point carrying member is integrally connected to the body portion of the cutter bit and as in the previous device, a bit point 85 is secured to the bit point carrying member.

Figure 8:
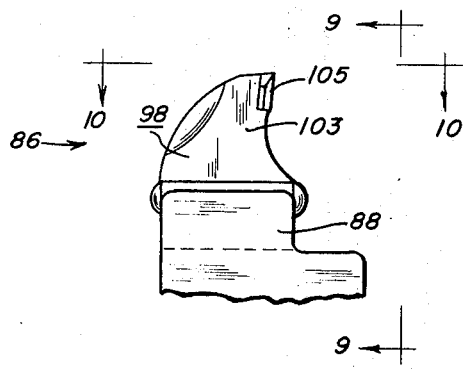
FIGURE 8 is a side elevational view of a still further modification of the cutting apparatus of the present invention.
Figure 9:
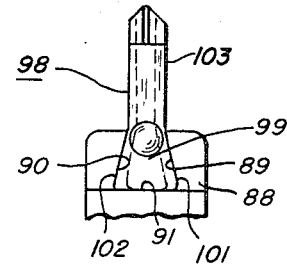
FIGURE 9 is a view taken generally along the line 9—9 of FIGURE 8.
Figure 10:
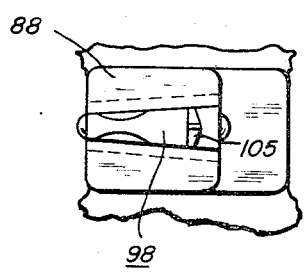
FIGURE 10 is a view taken generally along the line 10—10 of FIGURE 8.

A still further modification of the cutting apparatus is demonstrated in FIGURES 8, 9 and 10 wherein the cutting apparatus disclosed herein is identified generally by the reference numeral 86. This device also includes a holder body 88 having front and rear portions and wall means in the holder body serve to define a generally U-shaped slot which extends the entire length thereof. The slot has first and second sidewalls 89 and 90 as well as a bottom wall 91 and an open upper end. Each of the first and second sidewalls tapers toward each other as they extend from the front to the rear portion of the holder body and in this particular embodiment no inserts have been illustrated in this device. In this embodiment certain of the advantages of the other two devices are not present, however, in some installations this particular design is satisfactory. A cutter bit 98 is positioned within the holder construction and is provided with a body portion 99 which has first and second tapered side walls 101 and 102 respectively. The tapered sidewalls 101 and 102 have a taper which corresponds to the taper of the sidewalls 89 and 90 and in the assembled position are located in engagement therewith. A bit point carrying member 103 is integrally connected to the body portion 109 and extends therefrom and as in the previous devices, a bit point 105 is secured to the bit point carrying member.

In order to assemble the cutting apparatus which has been illustrated in FIGURES 1 through 4, it is only necessary to align the tapered surfaces on the body portion of the cutter bit with the tapered pins and insert the bit in a direction opposite to the direction indicated by the arrow 27 shown in FIGURE 1. The cutting bit or cutting direction of the chain and cutting apparatus is in the direction of arrow 27 and as a result there is no tendency to remove the cutter bit from the holder body, but rather a tendency to hold the cutter bit securely in the position shown. In order to dis-assemble or remove the cutter bit from the holder body, it is only necessary to tap the left end of the cutter bit as seen in FIGURE 1 with a hammer or similar device and easy removal is facilitated. The commercial life of the particular combination shown in FIGURES 1 through 4 and additionally that embodiment illustrated in FIGURES 5 through 7 is extremely good because with this construction it is possible to provide an extremely tough holder body while using an extremely hard and wear-resistant material for engagement with the cutter bit. By the use of the construction most easily understood by referring to FIGURE 1, it is possible to locate the cutter bit at a maximum distance to the rear of the holder body and because of this construction, the bit point is located in such a position that any raising or cocking of the chain links does not cause a corresponding gouging of the bit point into the material being cut. The particular construction shown herein which utilizes the open slot across the entire upper side of the holder body is an excellent construction in the sense that any dirt or foreign material in the slot may be easily removed therefrom and does not have a tendency to clog up the bit holding area. The three embodiments which have been illustrated herein although similar in some respects have peculiar advantages over each other and are not in the general sense equivalent to each other. It will be seen that the embodiment of FIGURES 5, 6 and 7 utilizes the open slot principle as well as the tapered, knurled surfaces. However, the knurled surfaces provide a different construction for preventing vertical removal of the cutter bit from the slot. The modification of FIGURES 8, 9 and 10 which does not utilize a hardened insert member does not have the advantages of the other designs which utilize the hardened insert members.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cutting apparatus including in combination a plurality of chain links connected together and adapted to move through a cutting path, said links comprising a holder body having front and rear portions, wall means in said holder body defining a generally U-shaped slot which extends the entire length of said holder body from said front to said rear portion thereof, said slot having first and second sidewalls, a bottom wall and an upper open end, first and second wall means in said holder body on opposed sides of said slot each defining the surface of at least part of a cone which intersects said first and second sidewalls of said slot, said conical surfaces having axes which extend generally parallel to the direction of the cutting path with the smaller diameter portion of said conical surfaces being located in said front portion of said holder body and said larger diameter portion being located in said rear portion of said holder body, first and second hardened conically shaped pins residing respectively in said first and second wall means in said holder body with a portion of each pin extending into said slot with the larger diameter portion of said pins located in said rear portion of said holder body, a cutter bit having a body portion with first and second generally parallel walls, wall means on said first and second walls of said body portion defining at least a portion of the surface of a cone and respectively receiving that portion of said first and second pins which extends into said slot, said cutter bit having a bit point carrying member integrally connected to said body portion and extending generally at right angles thereto, and a bit point secured to said bit point carrying member.

2. A cutting apparatus including in combination a plurality of chain links connected together and adapted to move through a cutting path, said links comprising a holder body having front and rear portions, wall means in said holder body defining a generally U-shaped slot which extends the entire length of said holder body from said front to said rear portion thereof, said slot having first and second sidewalls, a bottom wall and an upper open end, first and second wall means in said holder body on opposed sides of said slot, first and second tapered pins residing respectively in said first and second wall means in said holder body with a portion of each pin extending into said slot with the larger portion of said pins located in said rear portion of said holder body, a cutter bit having a body portion with first and second walls, wall means on said first and second walls of said body portion for respectively receiving that portion of said first and second pins which extends into said slot, said cutter bit having a bit point carrying member integrally connected to said body portion and extending therefrom, and a bit point secured to said bit point carrying member.

3. A cutter bit and holder combination comprising a holder body having front and rear portions, wall means in said holder body defining a generally U-shaped slot which extends the length of said holder body from said front to said rear portion thereof, said slot having first and second sidewalls, a bottom wall and an upper open end, first and second tapered insert members respectively connected to said first and second walls in said holder body with a portion of each extending into said slot with the larger portion of said insert members located in said rear portion of said holder body, a cutter bit having a body portion with first and second walls, wall means on said first and second walls of said body portion for respectively receiving a portion of said first and second tapered insert members, said cutter bit having a bit point carrying member which includes a bit point.

4. A cutter bit and holder combination; said holder comprising a holder body having front and rear portions, wall means in said holder body defining a generally U-shaped slot which extends the entire length thereof, said slot having first and second sidewalls, a bottom wall and an open upper end, first and second hardened insert members secured respectively to said first and second sidewalls of said slot, said first and second insert members having knurled surfaces tapering toward each other as they extend from said front to said rear portion of said holder body, said cutter bit having a body portion with first and second sidewalls having a taper corresponding to the taper on said knurled surfaces and positioned in engagement therewith, a bit point carrying member integrally connected to said body portion and extending therefrom, and a bit point secured to said bit point carrying member.

5. A cutter bit and holder combination; said holder comprising a holder body having front and rear portions, wall means in said holder body defining a slot, said slot having first and second sidewalls, a bottom wall and an open upper end, first and second insert members secured respectively to said first and second sidewalls of said slot, said first and second insert members having surfaces tapering toward each other as they extend from said front to said rear portion of said holder body, said cutter bit having a body portion with first and second sidewalls having a taper corresponding to the taper on said insert members and positioned in engagement therewith, a bit point carrying member integrally connected to said body portion and extending therefrom, and a bit point secured to said bit point carrying member.

6. A cutting apparatus including in combination a plurality of chain links connected together and adapted to move through a cutting path, said links comprising a holder body having front and rear portions, wall means in said holder body defining a slot, said slot having first and second sidewalls and a bottom wall, first and second wall means in said holder body on opposed sides of said slot, first and second tapered members residing respectively in said first and second wall means in said holder body with a portion of each tapered member extending into said slot, a cutter bit having a body portion with first and second walls, wall means on said first and second walls of said body portion for respectively receiving that portion of said first and second tapered members which extend into said slot, and said cutter bit having a point carrying member with a point thereon.

References Cited
UNITED STATES PATENTS 1,815,820   7/1931   Anderson   37—142
2,439,400   4/1948   Simmons   299—93

FOREIGN PATENTS 1,019,983   11/1957   Germany.

ERNEST R. PURSER, *Primary Examiner.*